Aug. 22, 1939. C. R. BUSCH 2,170,115
BRAKE HEAD
Filed Aug. 7, 1937 2 Sheets-Sheet 1

INVENTOR
Charles R. Busch
BY
ATTORNEY

Aug. 22, 1939.   C. R. BUSCH   2,170,115
BRAKE HEAD
Filed Aug. 7, 1937   2 Sheets-Sheet 2
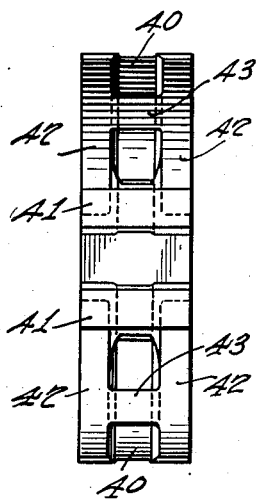
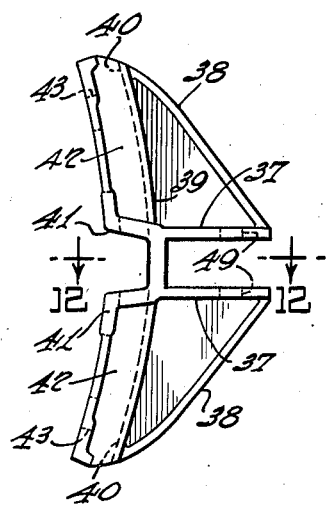
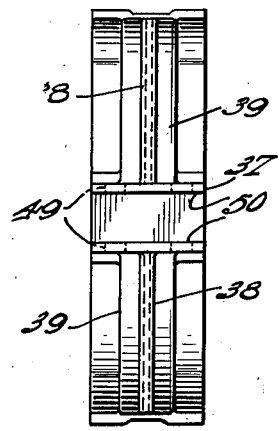
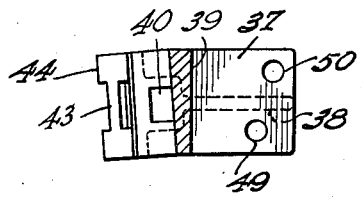
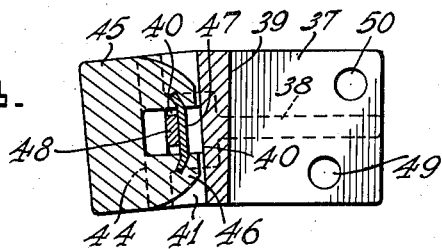
INVENTOR
Charles R. Busch.
BY
Geo. L. Wheelock
ATTORNEY Patented Aug. 22, 1939

2,170,115

UNITED STATES PATENT OFFICE 2,170,115

BRAKE HEAD

Charles R. Busch, Orange, N. J., assignor to Buffalo Brake Beam Company, New York, N. Y., a corporation of New York Application August 7, 1937, Serial No. 157,860

1 Claim. (Cl. 188—236)

The present invention relates to improvements in brake heads such as used in connection with railway car trucks and upon which brake shoes are mounted for applying a braking pressure to the car wheels. This application is a continuation in part of application Serial No. 134,792, filed April 3, 1937, but includes one specific departure therefrom as will be found.

One of the objects of the invention is to provide a brake shoe head which may be used either as a right or a left on a brake beam, such head being reversible, to which end the upper and lower halves of the head are of substantially the same size and mechanical construction from the middle of the head to the ends thereof.

Another object of the invention is to provide a brake head which is specially reinforced or strengthened so as to withstand the braking stresses which are imposed thereon in service.

An important object of the invention is to provide a brake head with a laterally inclined or canted face upon which a brake shoe may be supported in such way that its wheel braking surface will lie at an angle corresponding to the coning of the wheel tread, so that a braking pressure may be evenly applied by the shoe.

A further object of the invention is to provide a brake head with brake beam engaging surfaces or flanges extending rearwardly from the approximate middle transverse plane of the body of the head, preferably, although not necessarily, to adapt the brake head for mounting and securing it upon a special type of brake beam, as disclosed in aforesaid application.

These being among the objects of the present invention, the same consists of certain features of construction and combinations of parts to be hereinafter described and then claimed with reference to the accompanying drawings showing preferred embodiments of the invention, and wherein Fig. 1 is a face or front elevation of one construction of brake head;

Fig. 9 is a face view of another construction of brake head;

Fig. 10 is a side elevation thereof;

Fig. 11 is a rear elevation of the brake head shown in Figs. 9 and 10;

Fig. 12 is a transverse section on line 12—12, Fig. 10; and

Fig. 13 is a transverse section of the brake head shown in Figs. 9 to 12 inclusive, such section showing a brake shoe mounted thereon in canted position, such section being taken through the shoe lug, and parts being shown in broken lines.

Figure 1:
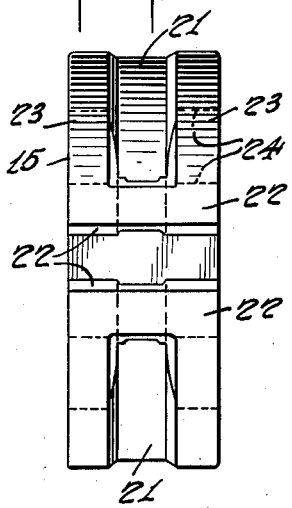
Figure 2:
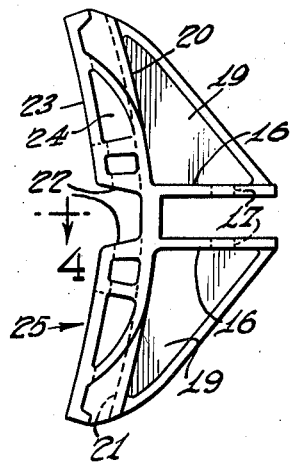
Fig. 2 is a side elevation thereof.
Figure 3:
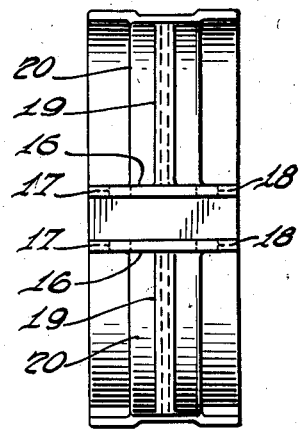
Fig. 3 is a rear elevation of such brake head.

Referring to Figs. 1 to 4 inclusive, the body 15 of the brake head is shown as provided with a jaw formed by a pair of parallel back flanges 16 extending transversely of the mid-length of the head and suitably spaced apart to receive the end of a brake beam between them. These flanges continue transversely preferably for the full width of the head and each of them is provided with a pair of holes 17, 18 for receiving the desired type of fastenings which secure the brake head to the beam.

Between the holes 17, 18 there are located bracket-like back ribs or reinforcements 19 which form brackets that extend lengthwise of the brake head and are formed integrally with the flanges 16, extending from the flanges 16 to corresponding ends of the head. The space between the flanges which is to receive the end of the brake beam extends in a plane which bisects the head. Each head is preferably cast of an integral piece of cast steel or other suitable metal.

The back portion 20 of the key-way of the head is that portion of the head which merges into the back ribs 19, and the key-way 21 in front thereof extends in the usual manner from end to end of the head.

At the front or face portion of the head there are brake head lugs 22 between which the usual shoe lug may be inserted to connect the shoe with the head when the same are keyed together. Extending from each brake head lug 22 to the corresponding end of the head there are longitudinal bridges or flanking portions 23 at the front of the head and which define the width of the key-way 21. Each of these longitudinal bridges 23 defines an opening 24 at the corresponding side of the head, so that except for the bridges 23 the front portion of the head corresponds with the front portion of the ordinary type of brake head. In other words, the exposed face surfaces of the bridges 23 are continuations of and form parts of the face of the brake head itself and the area of the face of the head is therefore greater than the key-way spaces exposed between the said bridges.

Figure 4:
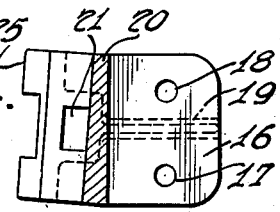
Fig. 4 is a transverse section on the line 4—4, Fig. 2, looking in the direction of the arrows.

It is preferred to laterally incline the shoe receiving face 25 of the head form end to end, such inclination being indicated in Fig. 4 and corresponding preferably, although not necessarily, to the usual 1 in 20 inclination of the bevel of the tread of each car wheel. When the ordinary brake shoe is fixed against the inclined face 25, its wear surface which engages with the car wheel will correspond to the coning thereof whether 1 in 20 or otherwise. When the brake shoe receiving face 25 of the head is inclined, the key-way 21 will also be laterally inclined to correspond therewith as shown in Fig. 4, so as to properly permit the insertion of a key through the brake head lugs 22 and the shoe lug located therebetween. It is preferred in this case to skew as a whole in the front parts of the brake head with respect to the back 20 of the head as shown in Fig. 4.

Referring to Figs. 5 to 8 inclusive, a brake head of another construction is illustrated. In this form of the invention the body of the head is provided with a pair of parallel transverse flanges 26 which are provided each with a single hole 26a, so that a suitable fastening such as a rivet or a bolt may be passed through the holes and through that end of a brake beam to which the head is to be secured. At opposite sides of the head and at each end thereof there is a pair of lateral parallel webs or flanges 27, 28 which form brackets that define sides of the head at points back of the inner wall portion or back 29 of the head. These flanges 27, 28 extend along substantially the length of one-half of the head, from each flange 26 to the corresponding upper or lower end of the head. Between each of the flanges 27, 28 and the back of the key-way longitudinal depressions 30 are formed so as to suitably lighten the adjacent portions of the head.

Figure 8:
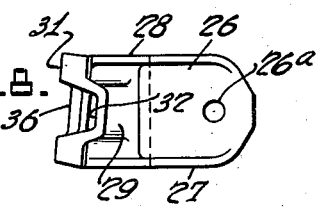
Fig. 8 is an end view of the brake head shown in Figs. 5, 6 and 7.

In this construction the shoe receiving face 31 of the head is also preferably inclined or canted laterally and the key-way 32 in such case would be correspondingly canted, as shown in the end elevation, Fig. 8. Such inclination is for the same purpose with respect to canting a brake shoe as is the construction described with respect to Fig. 4.

Figure 5:
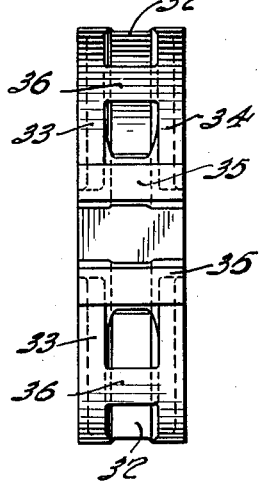
Fig. 5 is a face or front elevation of another construction of brake head.
Figure 6:
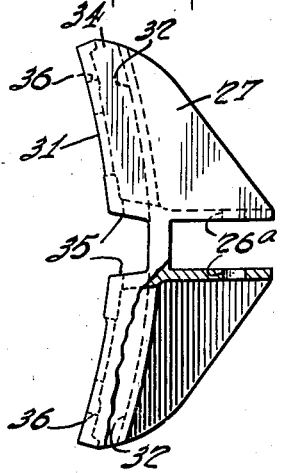
Fig. 6 is a side elevation thereof partly broken away and parts in dotted lines.
Figure 7:
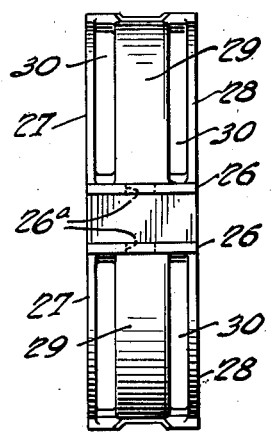
Fig. 7 is a rear elevation of the brake head shown in Figs. 5 and 6.

In Figs. 5 and 6, the brake head is shown as provided with solid side walls 33, 34 which extend longitudinally of the head, along each half thereof. The side walls or flanking portions 33, 34 of the key-way 32 extend parallel with the length of the head and the side surfaces thereof are flush with the side surfaces of the back flanges or webs 27, 28. Transverse head lugs 35 connect the side walls or flanking portions 33, 34 and are adapted to receive between them the lug of the brake shoe. For the purpose of reinforcing the front portion of the brake head, the side walls 33, 34 at each end of the head are connected by a transverse bridge or spanning element 36, each of which is located at a desirable distance away from the corresponding head lug 35. Such bridges 36 extend over the key-way 32 and over the key which is used to connect the brake shoe with the brake head.

Referring to Figs. 9 to 12 inclusive another construction of brake head is illustrated. In this construction the brake head has a pair of parallel back flanges 37. Extending from each flange 37 to the corresponding end of the brake head is a bracket-like back rib 38, and such back ribs extend in a plane which bisects the back of the head. The suitably formed back portion 39 of the head provides the back of the key-way 40 which extends from end to end of the head. At the front of the head there are brake head lugs 41 suitably spaced apart to receive the lug of a shoe between them. Solid longitudinal flanking portions or walls 42 extend longitudinally of the front of the head and define the width of the key-way 40. These side portions or walls 42 are connected at both ends of the head by transverse bridges 43, back of which is the key-way 40. The face 44 of the brake head is laterally inclined as shown in Fig. 12 and such inclination extends from end to end of the head. Preferably such inclination is 1 in 20 to correspond with the inclination or coning of the tread of the car wheel.

In Fig. 13 a brake shoe 45 is shown as applied to the brake head of Figs. 9 to 12 inclusive. Inasmuch as the face 44 of the brake head is laterally inclined, the brake shoe 45 will also be laterally inclined so that its wear surface will have an inclination corresponding to the coning of a car wheel. The brake shoe lug 46 may in the usual manner be provided with a hard steel cross piece 47, the ends of which are embedded in the shoe lug when the shoe is cast. The key-way 40 of the brake head is inclined to the same degree as the face 44 of the brake head, so that when the brake shoe key 48 is inserted into the key-way its middle portion will bear against the under sides of the head lugs 41 and the adjacent surface of the cross-piece 47 of the shoe lug. If the key-way 40 is not inclined to correspond with the inclination of the head face 44, there would be greater difficulty in inserting the key and rigidly mounting a brake shoe upon the head.

In Figs. 9 to 13 inclusive the flanges 37 whereby the brake head is adapted to be mounted upon a brake beam are provided with holes 49, 50, forming a pair of corresponding holes in each flange, and are offset or staggered with respect to each other, that is, the holes 49, 50 are disposed along a line which slants with respect to the back 39 of the head. This disposition of the holes 49, 50 would also require that the brake beam, not illustrated, be provided with holes which can register therewith when the brake head is properly mounted upon the beam, and when so mounted suitable fastenings can be passed through the said holes and through the beam so as to rigidly secure the heads thereupon.

The object of disposing the holes 49, 50 as described and illustrated is to render the head fool-proof against being placed in the wrong position on that end of the beam which is to receive it. This is because the head has a brake shoe receiving face which is preferably inclined, and when the brake beam is provided with holes to register with the reversible brake heads, the inclined faces of the brake heads will incline somewhat towards each other to correspond with the coning of the car wheels. Should a repair man not set the heads on the beam in the required position so that the faces of the heads will incline towards each other, he will be apprised of that said fact, because he could not then pass the rivets or other fastenings through the holes of the heads and the beam, and that will indicate to him that he must reverse the position of at least one of the heads. When all of the holes of the heads and beam are in registration, the repair man will know that each head is in proper position, and he will not have to pay attention to see if the faces of the heads are inclined towards each other or towards the mid-length of the beams.

Because the improved brake shoe head is reversible and provided with means for rendering it fool-proof, it is preferred that the upper and lower halves of the head are of substantially the same sizes and conventional shapes, and that the mechanical construction of each half from the middle plane of the head be substantially the same as the other half. This characteristic is largely attained by dispensing with the hanger openings or recesses which the usual brake heads of a suspended brake beam must have.

Obviously the invention is susceptible of more or less modification without departing from the scope of the appended claim.

What I claim as new is—

A reversible brake-shoe head, comprising a body having a pair of transverse back flanges forming a jaw for engaging with a brake-beam, and the flanges having means for indicating each end of the beam on which the head is to be mounted, and reinforcements extending from the flanges longitudinally along the back of the head to the ends of the head, the head having a longitudinal key-way extending in front of the reinforcements, in a laterally canted position relatively thereto, and also having a correspondingly canted face for receiving a brake-shoe.

CHARLES R. BUSCH.